United States Patent [19]

Praeur et al.

[11] Patent Number: 4,792,204
[45] Date of Patent: Dec. 20, 1988

[54] PROCESS AND APPARATUS FOR ELIMINATION OF TOLERANCE DEPENDENT VARIATIONS OF A SELECTABLE SPACING BETWEEN COMPONENTS IN OPTICAL COMMUNICATION EQUIPMENT

[75] Inventors: Heinz Praeur, Munich, Fed. Rep. of Germany; Alfred H. Johnson, Poughkeepsie, N.Y.; Dietmar Schulz, Munich; Peter Pohl, Krailling, both of Fed. Rep. of Germany

[73] Assignees: Siemens Aktiengesellschaft, Berlin and Munich, Fed. Rep. of Germany; IBM Corp., Armonk, N.Y.

[21] Appl. No.: 59,719

[22] Filed: Jun. 8, 1987

[51] Int. Cl.$^4$ ................................................ G02B 6/36
[52] U.S. Cl. .................................. 350/96.20; 350/96.16
[58] Field of Search ............... 350/96.20, 96.21, 96.22, 350/96.15, 96.16., 96.18

[56] References Cited

U.S. PATENT DOCUMENTS

| | | | |
|---|---|---|---|
| 4,291,943 | 9/1981 | Binek et al. ...................... | 350/96.22 |
| 4,364,064 | 12/1982 | Baves ............................. | 350/96.2 X |
| 4,639,074 | 1/1987 | Murphy ........................... | 350/96.2 X |
| 4,647,149 | 3/1987 | McCartney et al. ............... | 350/96.2 |
| 4,657,338 | 4/1987 | Khoe et al. ..................... | 350/96.2 X |
| 4,657,340 | 4/1987 | Tanaka et al. ................... | 350/96.2 |
| 4,657,341 | 4/1987 | Sammueller .................... | 350/96.2 X |

Primary Examiner—John D. Lee
Attorney, Agent, or Firm—Jeffrey P. Morris

[57] ABSTRACT

A process and a device for substantially eliminating tolerance-dependent variations of a preselectable space between the components of an optical communication apparatus is described. U-shaped recesses are provided in a metal casing for pressing in flange-type necks of, for example, optical transmitting and receiving devices. The parallel arranged devices are so spaced from each other that they are not subject to tolerance-dependent variations. For this purpose the metallic necks are coated with a plastic layer, and ribs provided at the lateral walls of the U-shaped recesses dig into the plastic layer. The necks are pressed in precisely at a predetermined spacing by means of a gauge. By the application of varying degrees of pressure when the ribs are pressed in on one side and the other side of the neck, one of the U-shaped recesses can be off-center.

9 Claims, 1 Drawing Sheet

PROCESS AND APPARATUS FOR ELIMINATION OF TOLERANCE DEPENDENT VARIATIONS OF A SELECTABLE SPACING BETWEEN COMPONENTS IN OPTICAL COMMUNICATION EQUIPMENT

BACKGROUND OF THE INVENTION

1. Field of the Invention

The present invention relates to a process and a device for eliminating tolerance-dependent variations of a preselectable space between the components used in optical communication equipment. More specifically, the invention relates to a process for eliminating tolerance-dependent variations of a preselectable space existing between at least two optical communication components which are arranged parallel to each other. The components are provided with a flange-type neck, and are respectively fixed with the neck at right angles to their longitudinal extension in a U-shaped recess of a wall of a casing which is provided for jointly accommodating at least two components.

2. Description of the Prior Art

Optical communication equipment frequently requires that transmitting and receiving modules, i.e., electro-optical and optoelectrical converters located at the ends of an optical communication circuit, be arranged in a common metal casing. At the same time, it is advantageous if the components formed by the two modules are located in the metal casing with precisely predetermined spacing. It is therefore a primary object of the present invention to provide a process by means of which a preselectable space, which is free from tolerance-dependent variations, can be maintained between two respective components of an optical communication equipment.

Yet another object of the present invention is to provide especially suitable flange-type necks for the aforementioned process.

SUMMARY OF THE INVENTION

In accordance with the present invention, the neck, which is made of a relatively hard material, is covered with layer of a plastic deformable and relatively soft material, and is pressed in between the lateral walls of a U-shaped recess, which is provided with at least one projecting rib running parallel to the lateral walls, that at least one rib at one side of the neck is pressed into the plastic deformable material to a lesser degree than the rib located at the other side of the neck, thus achieving the desired pre-selected space to the adjacent component. When the components are pressed, they can be maintained at a pre-determined spacing, e.g., by means of a gauge. Preferred embodiments of the component necks, which may be advantageously used in a process in accordance with the present invention, are described hereinafter.

Other objects and advantages of the present invention will become apparent with reference to the accompanying drawings and detailed description thereof, wherein:

DESCRIPTION OF THE PREFERRED EMBODIMENTS

Figure 1:
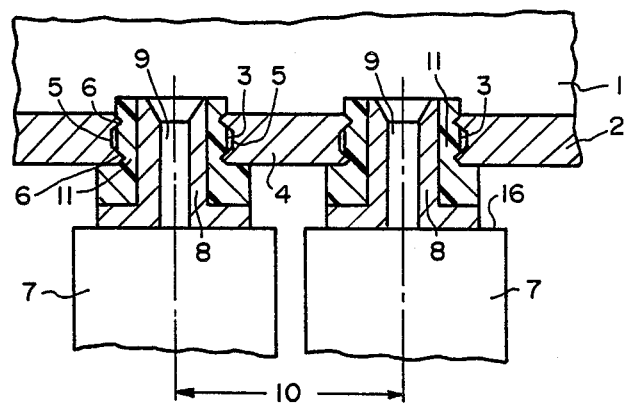
FIG. 1 shows the wall of a metal casing provided with U-shaped recesses and the flange-type necks of a transmitting and receiving module of an optical communication device located in the recesses.

FIG. 1 illustrates a metal casing 1 provided with a wall 2, both of which are so worked into the U-shaped recesses 3 that the recesses 3, which are similarly dimensioned, are open toward one edge 4 of the wall 2. The lateral walls 5 of the U-shaped recesses 3 are provided with ribs 6 which extend from the open end of the U-shaped recess to the enclosed end of the recess and, at the same time, run parallel to the wall 2. The ribs 6 thus reduce the space between the lateral wall 5 of each U-shaped recess.

Two components 7 of an optical communication equipment, preferably a transmitting and receiving module, respectively, are provided with a prismatic casing which has the advantage of having similar dimensions for both modules and is provided internally with an electro-optical or optoelectrical converter as well as other circuit components, e.g., amplifiers or the like. At one front end 16 of the component 7 they are provided with a flange-type neck 8, preferably made of metal and penetrated by a longitudinal borehole 9. This forms the neck 8 of a bushing into which a pin can be inserted. A light-conducting fiber inserted into the pin (not shown) may thus be coupled with a component which is arranged in the component 7 and either converts the light signals arriving via the fiber into electrical signals or, alternatively, may convert the electrical signals fed to the component 7 into optical signals, and then feed the signals into the fiber.

Two matching components 7 (for example, a transmitter and receiver) are arranged at a precise distance 10 from each other, so that, e.g., when electrically connecting the components 7, the joint insertion of the connecting pins projecting from the components 7 into the grid-type boreholes of a printed circuit board is not obstructed. The space 10 between the two components 7 is determined by the fixing of the necks 8 in the U-shaped recesses 3 of the casing wall 2.

In order to reduce cost when driving the U-shaped recesses into the wall 2 and for the protection of necks 8, the necks 8 are made of a relatively hard metal and are covered with a plastic layer 11. The plastic layer 11 is so dimensioned that the ribs 6, which dig into the plastic layer 11, cannot touch the neck 8. When, in the process of pressing the covered necks 8 into the respective U-shaped recesses the two components are maintained from each other at a precise predetermined distance, the two necks 8 are then pressed slightly off-center into the respective U-shaped recesses, while the deviation of the distance of the centers of the two U-shaped recesses from the distance 10 is tolerance-dependent. As a result, the ribs 6 located at one side of the neck 8 dig more strongly into the plastic layer 11, than those located at the other side, so that the components 7, after pressing the necks 8 into the appropriate U-shaped recesses are secured with precision to the wall 2 at the desired preselected spacing from each other.

Figure 2:
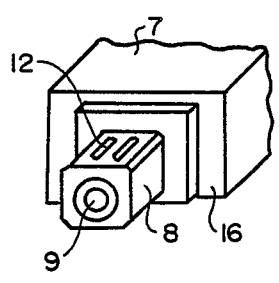
FIG. 2 shows a flange-type neck of a transmitting and receiving module without the casing of the neck.

FIG. 2 shows that the metallic, flange-type neck 8 can be provided with external grooves 12 which improve the coupling between the flange-shaped neck 8 and the plastic layer 11. Instead of grooves, it is also possible alternatively to provide slight elevations or a combination of both grooves and elevations.

Figure 3:
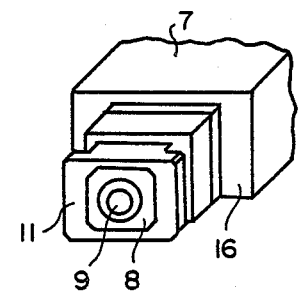
FIG. 3 through FIG. 6 show various embodiments for encasing a neck with a plastic deformable material.

FIG. 3 shows a flange-type neck 8 with an extrusion coated plastic layer 11.

Figure 4:
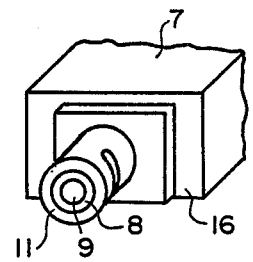

FIG. 4 shows that the flange-type neck 8, instead of having a rectangular cross-section, can also be provided with a round cross-section, so that the neck 8 is shaped cylindrically.

Figure 5:
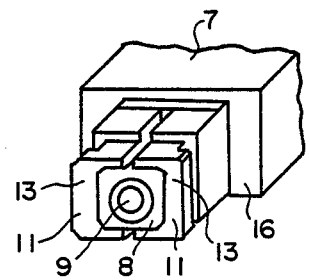
Figure 6:
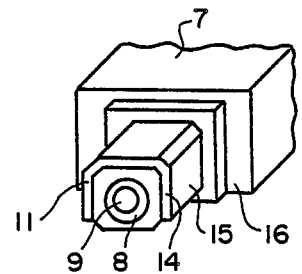

FIG. 3 and FIG. 4 respectively show a flange 8 coated with plastic layers 11, which are irreversibly joined with their neck 8, so that the flange-type neck can only be pressed once into the U-shaped recess 3. FIG. 5 and FIG. 6 show necks 8 which have attached thereto the prefabricated plastic components 13, 14 forming the plastic layer 11.

In the embodiment according to FIG. 5, the plastic layer 11 is comprised of two prefabricated U-shaped semi-shells 13 which are inserted at right angles to the press-in direction of the neck 8 from both sides into a U-shaped recess 3 of a neck 8 having a rectangular cross-section. When the neck 8 is pressed in, the two semi-shells 13 located upon the neck 8 are additionally pressed against each other and are thus unable to slip off the neck 8.

FIG. 6 shows a plastic casing 11 of a neck 8, where a prefabricated U-shaped plastic component is slid onto the neck 8 from one side. The U-shaped component 14 is so slid onto the flange-type neck 8 that the enclosed side of the component 14 faces the enclosed side of the U-shaped recess 3. This prevents the component 14 from slipping off the neck 8 when the neck is pressed in. The ribs dig into the sides 15 of the component 14.

What is claimed is:

1. A process for substantially eliminating tolerance-dependent variations of a selectable space between at least two optical communication components arranged in parallel to each other, said components each being provided with a flange-type neck, and which are respectively fixed with said neck at right angles to their longitudinal extension in a U-shaped recess of a wall of a casing provided for jointly holding at least two of said components, comprising the steps of:
    Covering each of said necks with a layer of a deformable plastic and soft material relative to a hard material of which said necks are comprised;
    Pressing each of said necks at right angles to the longitudinal extension of said necks in between lateral walls of said U-shaped recesses, which walls are provided with at least one projecting rib running parallel to said walls, such that at least one of said projecting ribs at one side of each neck is pressed at right angles to the longitudinal extension of said necks into the plastic deformable material a lesser amount than is the rib located on the other side of the said neck, thereby obtaining said preselectable space with respect to the adjacent component.

2. A process in accordance with claim 1 wherein said necks are metallic and are coated with a plastic layer.

3. A process in accordance with claim 2 comprising the further step of inserting two prefabricated U-shaped plastic semi-shells at right angles to the longitudinal extension of the neck into a U-shaped recess on the neck, said necks being rectanglar in their cross-section.

4. A process in accordance with claim 1, wherein U-shaped sides of a prefabricated plastic component are slid upon each of the said necks parallel to the U-shaped walls of the U-shaped recess.

5. In a flange-type neck for a transmitting and receiving optical communication module, a metallic neck element coated with a plastic layer for use in the process as claimed by claim 1.

6. Apparatus for substantially eliminating tolerancedependent variations of spacing between at least two components arranged in parallel to each other, said components each being provided with a flange-type neck, and which are respectively fixed with said neck at right angles to their longitudinal extension in a U-shaped recess of a wall of a casing provided for jointly holding at least two of said components, comprising:
    A plurality of necks each covered with a layer of a deformable plastic and soft material relative to a material of which said necks are comprised; whereby each of the said necks is adapted to be pressed at right angles to the longitudinal extension of said necks in between lateral walls of said U-shaped recesses, which walls include at least one projecting rib running parallel to said walls, such that at least one of said projecting ribs at one side of each neck is pressed at right angles to the longitudinal extension of said necks into the deformable plastic material a lesser amount than is the rib located on the other side of the said neck, thereby obtaining said spacing with respect to the adjacent component.

7. Apparatus in accordance with claim 6 wherein said necks are metallic and are coated with a plastic layer.

8. Apparatus in accordance with claim 7 further including two prefabricated U-shaped plastic semi-shells at right angles to the longitudinal extension of the neck into a U-shaped recess on the neck, said necks being rectangular in their cross-section.

9. Apparatus in accordance with claim 6 wherein said components are optical communication components.

* * * * *